O. C. HOUGHTON.
TRACTION ENGINE.
APPLICATION FILED OCT. 31, 1913.

1,106,046.

Patented Aug. 4, 1914.
4 SHEETS—SHEET 2.

O. C. HOUGHTON.
TRACTION ENGINE.
APPLICATION FILED OCT. 31, 1913.

1,106,046.

Patented Aug. 4, 1914.
4 SHEETS—SHEET 4.

WITNESSES:
Geo. C. Davison.
A. W. Cooper.

INVENTOR:
ORLEY C. HOUGHTON,
BY Michael J. Stark & Son
ATTORNEYS.

UNITED STATES PATENT OFFICE.

ORLEY C. HOUGHTON, OF CHICAGO, ILLINOIS, ASSIGNOR TO BULLOCK TRACTOR COMPANY, OF CHICAGO, ILLINOIS, A CORPORATION OF ILLINOIS.

TRACTION-ENGINE.

1,106,046.   Specification of Letters Patent.   Patented Aug. 4, 1914.

Application filed October 31, 1913. Serial No. 798,474.

*To all whom it may concern:*

Be it known that I, ORLEY C. HOUGHTON, a citizen of the United States, and a resident of the city of Chicago, in the county of Cook and State of Illinois, have invented a certain new and useful Improvement in Traction-Engines; and I do hereby declare that the following description of my said invention, taken in connection with the accompanying sheets of drawings, forms a full, clear, and specific specification, which will enable others skilled in the art to which it appertains to make and use the same.

My invention relates generally to improvements in traction engines, and it consists, essentially, in the novel and peculiar combination of parts and details of construction, as hereinafter first fully set forth and described and then pointed out in the claims.

Figure 1:
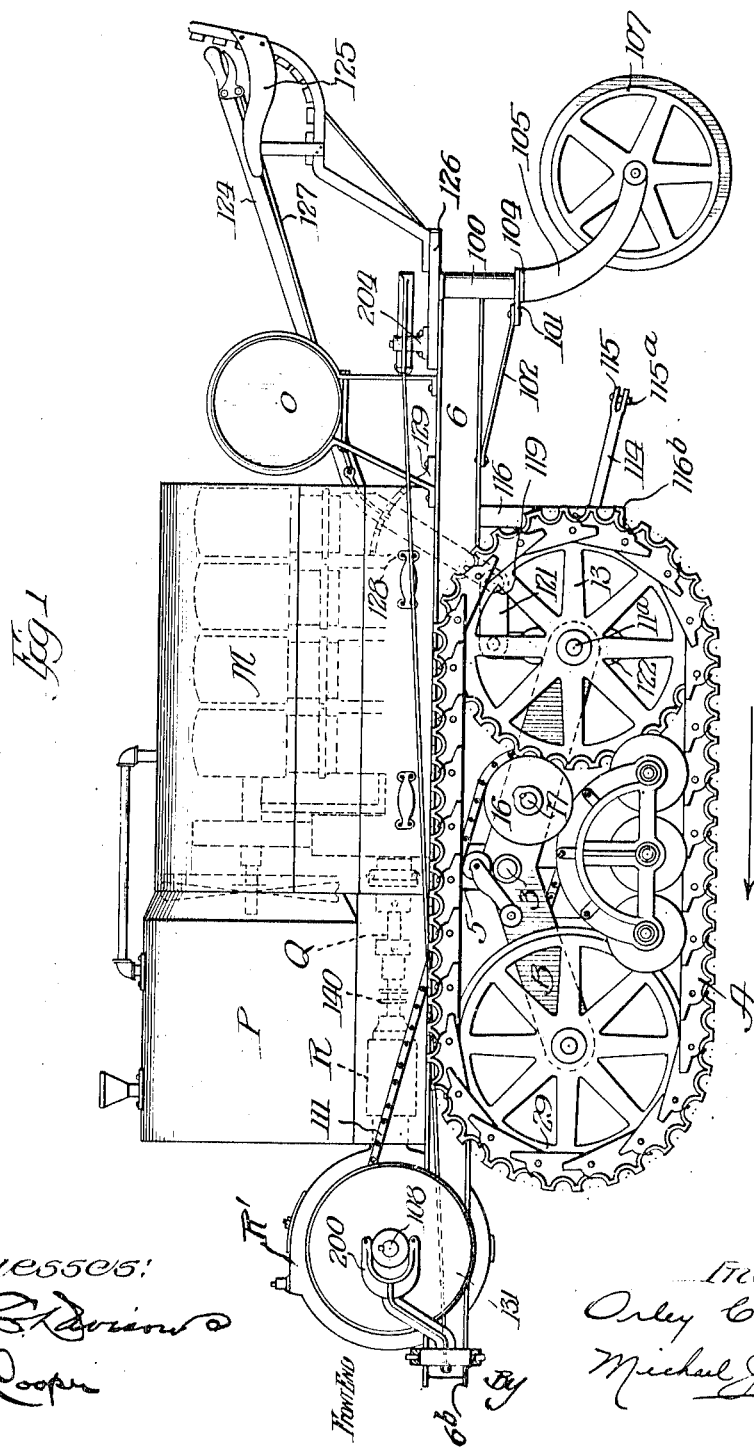
Figure 2:
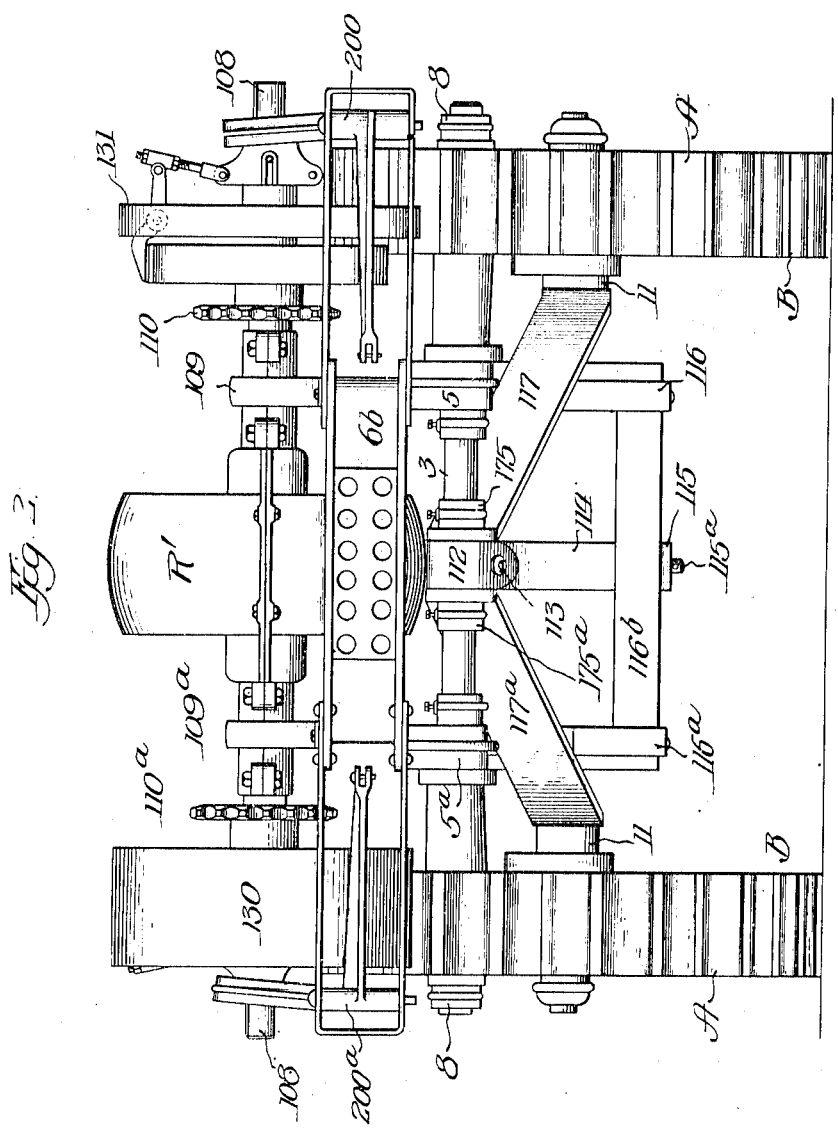
Figure 3:
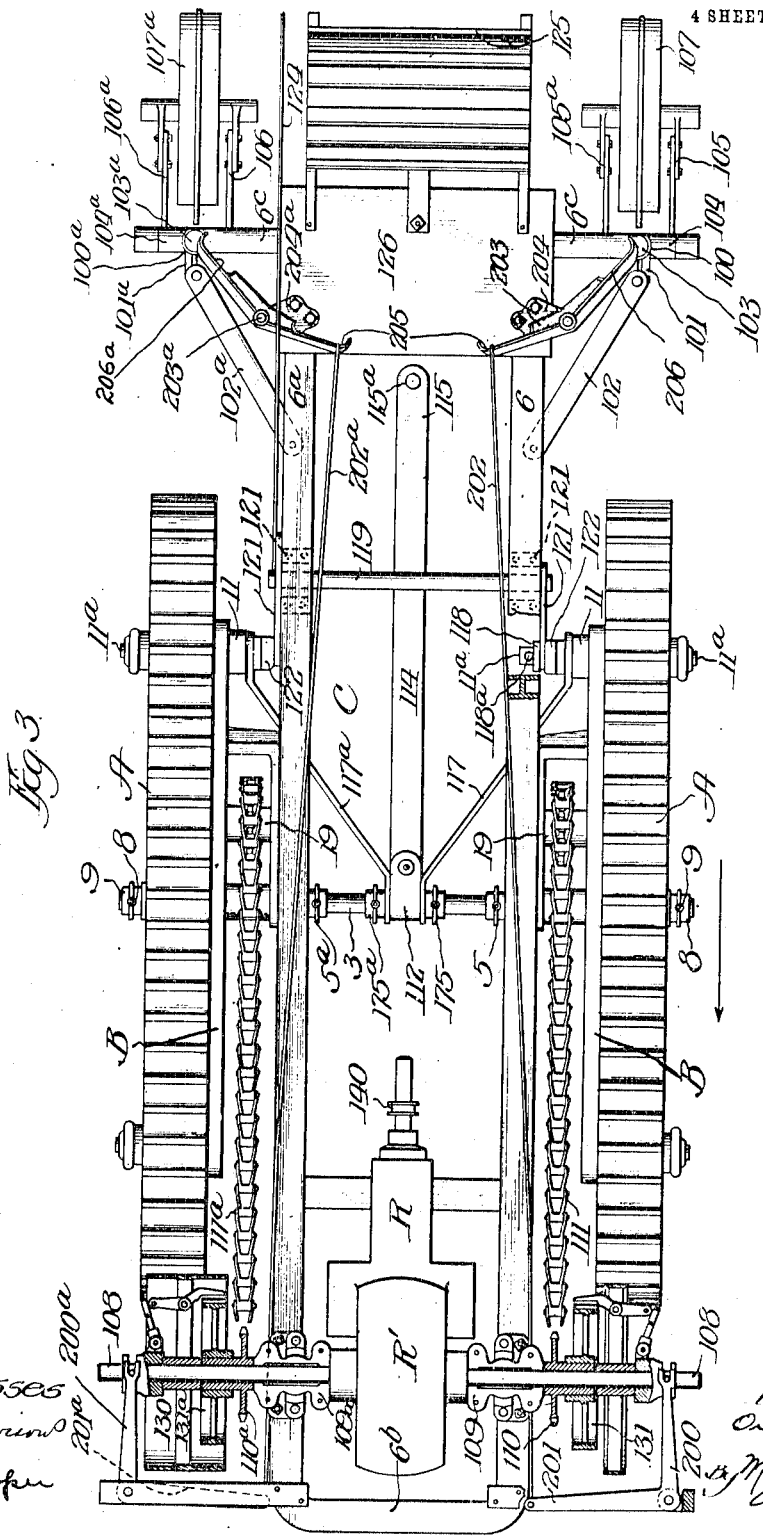
Figure 4:
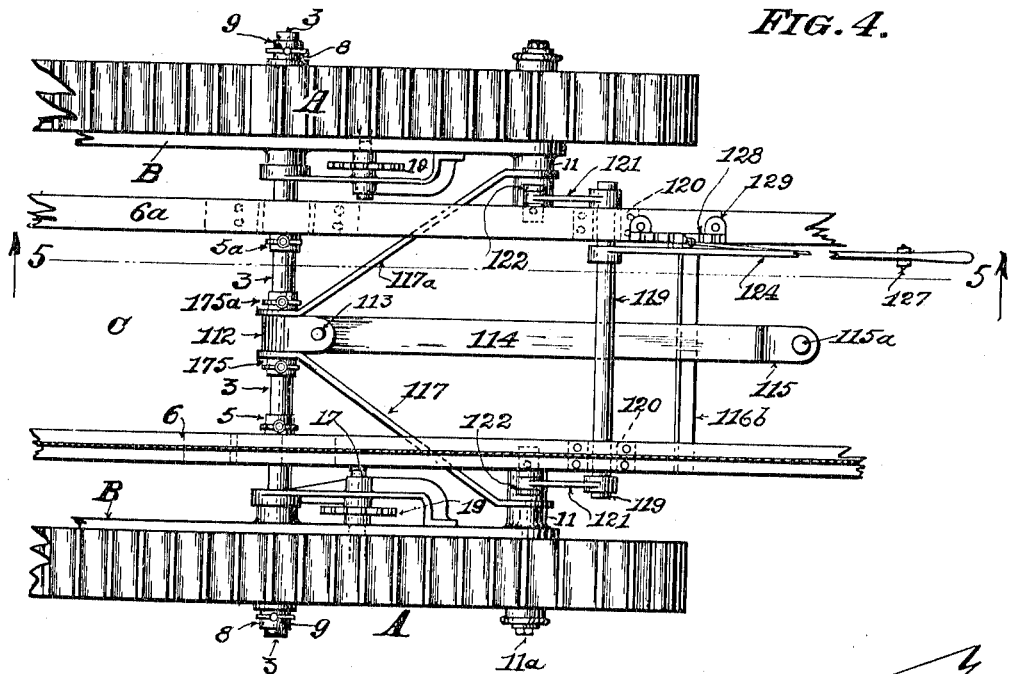
Figure 5:
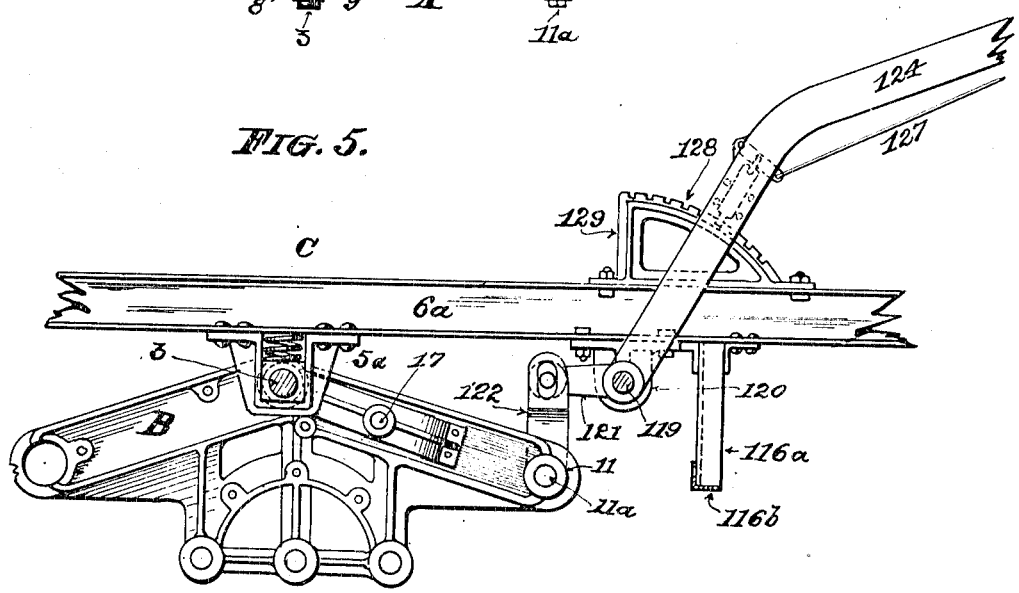

In the drawings already referred to, which serve to illustrate my said invention more fully, Figure 1 is a front elevation of the tractor of my improved traction engine, Fig. 2 is a plan with the power plant removed, and Fig. 3 a plan of the same, the power plant being removed to disclose underlying mechanism. Fig. 4 is a plan of the rear portion of the tractor illustrating the mechanism for raising and depressing the truck frames. Fig. 5 is a sectional view of the same on line 5—5 of Fig. 4.

Like parts are designated by corresponding characters and symbols of reference in all the figures of the drawings.

One great fault in traction engines of the endless track type is the tremendous power loss while negotiating turns. When swerving from a straight course, there is caused a skidding action of one or the other endless track chains, depending upon the direction of the swerving movement, and also a drag upon the ground of one of the chains. The power loss from this alone often reduces the effective tractive force of the engine from 25 to 30 per cent. Again the stresses and reversal of stresses produced are abnormal and result in a frequent breakage of parts at inconvenient times.

The essence of my invention, therefore, resides in means to prevent this skidding action and drag of the endless track chains while executing a turning movement and the elimination of the abnormal stresses created thereby. Thus to better understand my invention, I now refer to the drawings in which—

C represents the main structural frame of a traction engine composed preferably of structural beams and comprising essentially, longitudinal sills 6 and $6^a$ and a front connecting beam $6^b$. Said frame may be bent up from a single beam as indicated in Fig. 3, or beam $6^b$ may be riveted to sills 6 and $6^a$ as may be desired. At the opposite or rear end of frame C there is securely fastened a cross beam $6^c$, the ends of which project a considerable distance beyond the side sills 6 and $6^a$. At the ends of the said beam are rigidly attached in a vertical plane downwardly-pending tubular trunnions 100 and $100^a$. At the lower ends of these trunnions are lips 101 and $101^a$ to which are riveted diagonal braces 102 and $102^a$, the opposite ends of which are similarly fastened to the under sides of sills 6 and $6^a$, respectively. The object of these braces is to impart additional stiffness to trunnions 100 and $100^a$ to better resist undue stresses and strains.

Freely fitting the interior of the trunnions 100 and $100^a$ and rotatable therein are shanks 103 and $103^a$ of rearwardly bent forked frames 104 and $104^a$, between the legs 105 and $105^a$, and 106 and $106^a$ of which, are journaled trailing ground wheels 107 and $107^a$. No steering mechanism whatever is required, as the wheels will trail along in the usual manner, as hereinafter referred to.

Upon the main frame C is located a power plant comprising an internal combustion motor M with its usual appurtenances, such as gasolene and water tanks O and P respectively. Shaft Q of said motor is connected with a transmission and differential mechanism R and R', which may be of any preferred type of construction. Said transmission is located in alinement with the longitudinal center of the frame C, near the front connecting beam $6^b$ thereof, upon a transverse transmission shaft 108, which shaft is mounted in suitable journal bearings 109 and $109^a$ fastened to the side sills 6 and $6^a$ respectively.

Located under sills 6 and $6^a$ near the point of the longitudinal center of loading of frame C, are journal boxes 5 and $5^a$ for the reception of a transverse shaft 3, which shaft is firmly held from rotation in said boxes by suitable pins passing through the same or otherwise. This shaft projects an equal distance beyond side sills 6 and 6ª, and these ends are fitted into suitable openings in traction trucks B, collars 8 and pins 9 on the ends of said shaft being employed to prevent the withdrawal of said trucks from said shaft ends. These trucks support the frame structure C and its load at about its longitudinal center of loading, the balance being slightly in favor of the rear end where a certain proportion of the weight is borne by the trailer wheels 107 and 107ª, the proportion of such weight being only enough to prevent the frame C from tilting about the axis of the shaft 3.

Traction trucks B are provided with power receiving sprockets 19, which sprockets are in alinement with sprockets 110 and 110ª located on shaft 108, exteriorly of the sill 6 and 6ª of the frame C, as clearly seen in Figs. 2 and 3. Trained over sprockets 110 and 110ª and their respective power receiving sprockets 19 are link belts 111 and 111ª, whereby power may be transmitted to said sprockets 19, their shafts 17, pinions 16, endless track drive sprockets 13, idler wheels 29, and caterpillar chains A, all as best seen in Fig. 1.

Centrally of and embracing shaft 3, in alinement with the longitudinal center line of frame C, is a U-shaped forging 112, between the open jaws of which is retained, by a pin 113, a rearwardly and downwardly extending drawbar 114, the free end of which is formed into a fork 115 having a pin 115ª, to which may be attached a suitable cable when the outfit is employed for haulage. Near the outer end of this drawbar is provided a support therefor, composed of angles 116 and 116ª, depending from sills 6 and 6ª and a horizontal, transverse angle 116ᵇ, which connects angles 116 and 116ª. It will now be observed that the drawbar 114 being swiveled in U-shaped forgings 112, the same may slide along angle 116ᵇ and a direct line pull will always be had from the said bar, even when the engine is turning a corner. It is also to be recalled that the drawbar being attached at a point in about the center of loading, no undue stresses are set up in the frame C under excessive tractive effort.

Embracing shaft 3 on either side of U-shaped forging 112 are heavy diagonal braces 117 and 117ª, held in place by collars 175 and 175ª, the free ends of which extend downwardly and outwardly to and embrace the inner ends of shafts 11ª (located in the rear end of traction trucks B) adjacent hubs 11. These braces are rigidly maintained in position on these shafts and the object thereof is to maintain trucks B in relative parallelism and yet permit a certain flexibility thereof while turning corners. Attention is also directed to the fact that the said trucks being oscillatably mounted under frame C, the same may independently mount over obstructions in the path of travel without creating an undue strain throughout the entire frame. Again by a reference to Fig. 1, it will be seen that a line drawn from the center of shaft 108 to the center of shaft 17 will also pass through the center of shaft 3, which is the axis of oscillation for the trucks B. This being the case, and the fact that shaft 17 is as close as possible to shaft 3, it will be obvious that, no matter how great the oscillation of the trucks B within practical limits, the variations of the center distances between shafts 108 and 17 will be almost imperceptible, so that there will be no tightening or loosening of chains 111 and 111ª under any conditions of service. Tightening of chains means great friction and loss of power; loosening thereof means a flop of the chains with the danger of jumping from their sprockets and consequent breakage of adjacent parts. By eliminating these serious faults, as I have, I produce an outfit of higher efficiency and greater lasting qualities than any with which I am acquainted.

To reduce the skidding and drag of the inner endless track chain when turning sharp corners, as most frequently encountered on farm work, such as plowing, harvesting and the like, I provide certain means by which either one or the other end of both of the traction trucks may be bodily and simultaneously lifted from the ground whereby the turning movement of the vehicle is confined to only a very small portion of the length of the endless track chains normally in contact with the ground, and the skidding and drag thereof practically eliminated. This means consists essentially of a transverse shaft 119 oscillatable in journal brackets 120 located on the underside of sills 6 and 6ª. Adjacent sill 6 and exteriorly thereof, this shaft is provided with a securely fastened crank arm 121, from which depends a vertically disposed link 122, which embraces the inner end of shaft 11ª, as indicated in Figs. 1 and 3. Adjacent and exteriorly of sill 6ª, shaft 119 is provided with a similar crank arm 121 and link 122 the whole connecting in a like manner with the shaft 11ª of the truck B on that side of the outfit. Said shaft 119 is also possessed of a long hand lever 124 extending rearwardly to a point in close proximity to a seat 125 located at the extreme rear end of the machine, on an operating platform 126. Said lever is possessed of a latch mechanism 127 adapted to engage notches 128 in a quadrant 129, whereby the hand lever 124 may be locked in any one of several predetermined positions. The operation of this device may now be described as follows: When the endless track chains A are in road contact for their entire length, the position of hand lever 124 will be as seen in Fig. 1. But when the machine approaches a corner to be turned, the operator occupying the seat 125 first depresses the lever 124 to its lowest point, when the rear end of the trucks B will be elevated from the ground in a manner readily comprehended, after which the steering device hereinafter referred to is actuated. When it is required to make a turn while backing up, the lever 124 is raised to its highest position with its latch mechanism engaging the uppermost of the notches 128 of the quadrant 129, when it will be seen that the forward ends of the trucks are elevated free of the road surface. The steering is then accomplished as described below.

In the course of my experience in tractors of the endless track type, I have definitely determined the fact that independent steering wheels are superfluous. In other words the tractor trucks with their endless track chains possess the best potentials of a successful steering mechanism. I have found that a retardation in speed of the inner endless track chain and a similar acceleration of the outer will quickly change the course of travel in a direction toward the retarded truck. As a matter of fact I have been able to turn a machine completely around in slightly more than its own length. The one objection to so steering an endless track tractor is a certain amount of side drag and skidding of both of the ground chains, and this objection I have overcome by elevating one end of both of the trucks as above described while making a turn.

The friction clutches 131 and 131ª, Fig. 3, carrying the sprockets 110 and 110ª on shaft 108 are actuated by bell crank levers 200 and 200ª, the horizontally disposed arms 201 and 201ª of which are connected by means of rods 202 and 202ª to levers 203 and 203ª. These levers are pivoted centrally of their length in posts 204 and 204ª so as to oscillate in a horizontal plane. The ends of said rods are attached to the inner ends of said levers as at 205 and the outer ends are formed with foot grips 206 and 206ª, which are arranged conveniently to the seat 125, so that the operator occupying said seat may conveniently rest his feet in said grips. The mode of steering is now evident. First the operator depresses handle 124 without leaving his seat and then increases the pressure of his foot on one of the foot levers, at the same time easing off on the other.

To one end of shaft 108, exteriorly of sprocket 110ª and its encircling clutch 131ª, is fastened a pulley 130 for the reception of a suitable belt, whereby the tractor may be employed for threshing and like purposes. When this is desired all that is necessary is to release friction clutches 131 and 131ª. When these clutches are thrown out of engagement with shaft 108 it is evident that sprockets 110 and 110ª will cease to revolve and the machine as a whole will remain stationary, while shaft 108 and pulley 130 will continue to rotate as long as the motor M is in operation. Reversal of rotation of shaft 108 is accomplished by sliding sleeve 140, which will actuate the reverse mechanism within transmission R, which may be of any preferred type.

While herein I have described the preferred construction of my traction engine, I desire it understood that I may make such changes therein as would suggest themselves to the skilled mechanic and permitted under the doctrine of mechanical equivalents without falling outside the spirit or scope of my invention.

Having thus fully described my invention, I claim as new and desire to secure to myself by Letters Patent of the United States—

1. In a traction engine, the combination, of a main frame, a pair of truck frames pivotally connected to said main frame, said truck frames having means constructed to oscillate said truck frames on their pivots, said means including a transverse pivot shaft, bearings pending from said main frame wherein said transverse pivot shaft is journaled, a second transverse shaft in parallel spaced relation to said pivot shaft, bearings pending from said main frame wherein the latter shaft is journaled, short arms at the terminals of said latter transverse shaft, a long, curved arm secured at one end to said latter transverse shaft, latch mechanism on said long arm, a quadrant mounted upon one member of said main frame adjacent to said long arm, said quadrant having notches wherewith said latch mechanism is constructed to engage, links connected at one end to said short arms, track sprockets mounted in said truck frame, shafts on which said sprockets are constructed to rotate, said shafts being located at the terminals of said truck frame, one of said shafts projecting inwardly from said truck frame, said links being connected at the projecting portions of the latter shafts, and brace rods connecting said sprocket shafts medially to said pivot shaft.

2. In a traction engine, having endless tracks on which the tractor is constructed to move, means for steering the tractor by said endless tracks, said means including a main frame, truck frames pivotally connected to said main frame, a sprocket and an idler wheel mounted in each truck frame, an endless track trained over said sprocket and idler wheel, a motor mounted on said main frame, driving mechanism including a pair of friction clutches constructed to separately connect and disconnect said driving mechanism to, and from, said truck sprockets to operate said endless tracks conjointly with, and independently of each other, and mechanism constructed to vary the speed of one or the other of said tracks, said mechanism including treadles adjacent to the rear end of the main frame, rods connecting said treadles to said friction clutches, said friction clutches being normally in engagement with said driving mechanism, whereby by moving one or the other of said treadles, the corresponding friction clutch is partly released to cause retardation of the movement of that one of said endless tracks which is controlled by said friction clutch.

In testimony whereof I have hereunto set my hand in the presence of two subscribing witnesses.

ORLEY C. HOUGHTON.

In the presence of—
W. HARDING,
WILLIAM O. STARK.